(12) United States Patent
Hetherington

(10) Patent No.: US 7,602,376 B1
(45) Date of Patent: Oct. 13, 2009

(54) MOVING DIELECTRIC, CAPACITIVE POSITION SENSOR CONFIGURATIONS

(75) Inventor: Jack H. Hetherington, Haslett, MI (US)

(73) Assignee: P.I. Engineering, Inc., Williamston, MI (US)

( * ) Notice: Subject to any disclaimer, the term of this patent is extended or adjusted under 35 U.S.C. 154(b) by 2193 days.

(21) Appl. No.: 09/684,205

(22) Filed: Oct. 6, 2000

Related U.S. Application Data

(60) Provisional application No. 60/183,997, filed on Feb. 22, 2000.

(51) Int. Cl.
    *G09G 5/08* (2006.01)
(52) U.S. Cl. ............ 345/161; 345/163; 345/167
(58) Field of Classification Search ......... 345/156–184; 463/37, 38; 340/870.37
    See application file for complete search history.

(56) References Cited

U.S. PATENT DOCUMENTS

| | | | | |
|---|---|---|---|---|
| 4,156,130 A | 5/1979 | Ivashin et al. | ........... | 235/92 MP |
| 4,161,726 A | 7/1979 | Burson et al. | ........... | 340/365 R |
| 4,305,007 A | 12/1981 | Hughes | ........... | 307/116 |
| 4,386,312 A | 5/1983 | Briefer | ........... | 324/60 C |
| 4,489,303 A | 12/1984 | Martin | ........... | 338/128 |
| 4,501,939 A | 2/1985 | Hyltin et al. | ........... | 200/6 A |
| 4,590,339 A | 5/1986 | Scott-Jackson et al. | ........... | 200/6 A |
| 4,767,940 A | 8/1988 | Tuttle | ........... | 307/116 |
| 4,794,321 A | 12/1988 | Dotsko | ........... | 324/61 P |
| 4,864,295 A | 9/1989 | Rohr | ........... | 340/870.37 |
| 4,879,556 A | 11/1989 | Duimel | ........... | 341/20 |
| 5,087,904 A | 2/1992 | DeVolpi | ........... | 338/128 |
| 5,160,918 A | 11/1992 | Saposnik et al. | ........... | 340/709 |
| 5,225,831 A | 7/1993 | Osborn | ........... | 341/20 |
| 5,293,158 A | 3/1994 | Soma | ........... | 345/161 |
| 5,367,199 A | 11/1994 | Lefkowitz et al. | ........... | 307/116 |
| 5,418,468 A * | 5/1995 | Baker et al. | ........... | 324/674 |
| 5,421,694 A | 6/1995 | Baker et al. | ........... | 414/694 |
| 5,479,191 A * | 12/1995 | Komatsu | ........... | 345/161 |
| 5,537,109 A | 7/1996 | Dowd | ........... | 340/870.37 |
| 5,576,704 A | 11/1996 | Baker et al. | ........... | 341/20 |
| 5,598,153 A | 1/1997 | Brasseur et al. | ........... | 340/870.37 |
| 5,786,997 A | 7/1998 | Hoyt et al. | ........... | 364/190 |
| 5,790,107 A * | 8/1998 | Kasser et al. | ........... | 345/174 |
| 5,911,627 A | 6/1999 | Piot et al. | ........... | 463/38 |
| 5,949,354 A | 9/1999 | Chang | ........... | 341/33 |
| 6,184,865 B1 * | 2/2001 | Zimmerman et al. | ........... | 345/160 |
| 6,208,328 B1 * | 3/2001 | Kawachiya et al. | ........... | 345/157 |
| 6,304,091 B1 * | 10/2001 | Shahoian et al. | ........... | 324/662 |

FOREIGN PATENT DOCUMENTS

WO    WO 9850759 A1 * 11/1998

\* cited by examiner

*Primary Examiner*—Jimmy H Nguyen
(74) *Attorney, Agent, or Firm*—Gifford, Krass, Sprinkle, Anderson & Citkowski, P.C.

(57) ABSTRACT

A capacitive sensor configuration is capable of determining position and/or velocity for rotary or linear translation using a movable dielectric element coupled to an elongate member. The dielectric element is supported between at least one detection plate and a plurality of transmitting plates. By measuring the charge on the detecting plate, the capacitances of the assembly at a given point in time can be determined, and this measurement is used to solve for position of the member. The dielectric need not be rigid, and the dielectric's distance from the plates does not have to be tightly controlled. The apparatus can be used to measure the position or velocity of a variety of devices, including computer peripherals such as mice, keyboards, joysticks, and other input control panels and pointing devices.

14 Claims, 8 Drawing Sheets

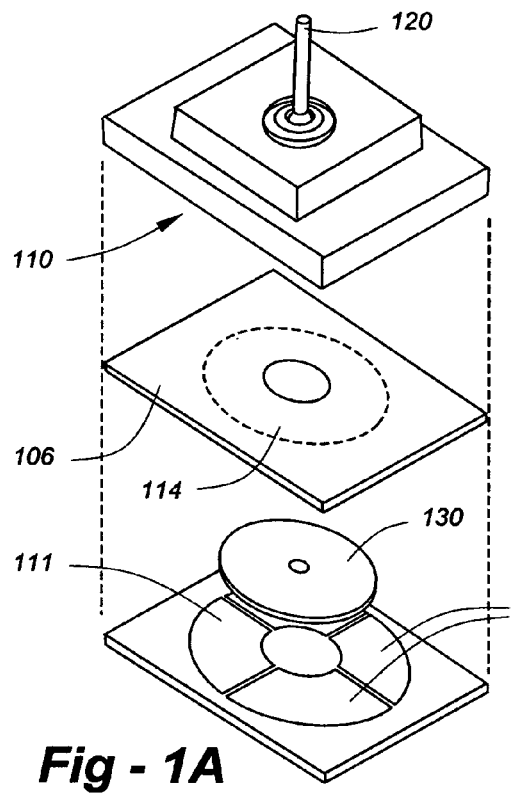
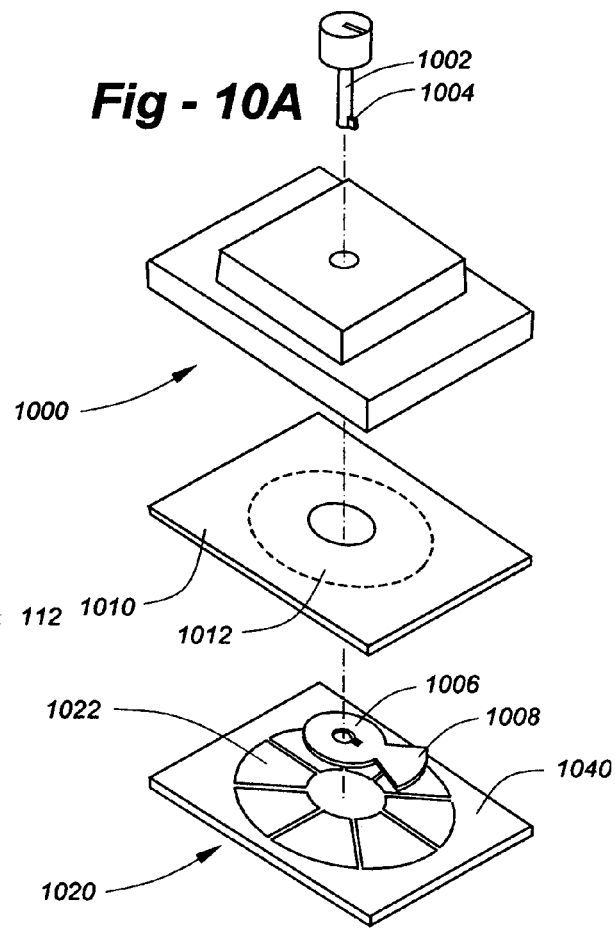
Fig - 1A
Fig - 10A
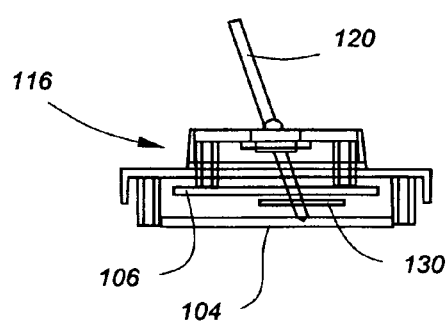
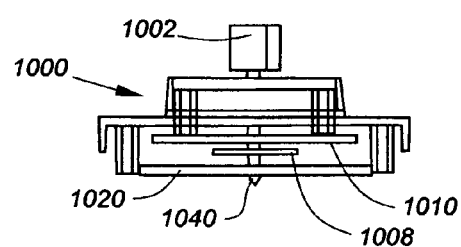
Fig - 1B
Fig - 10B

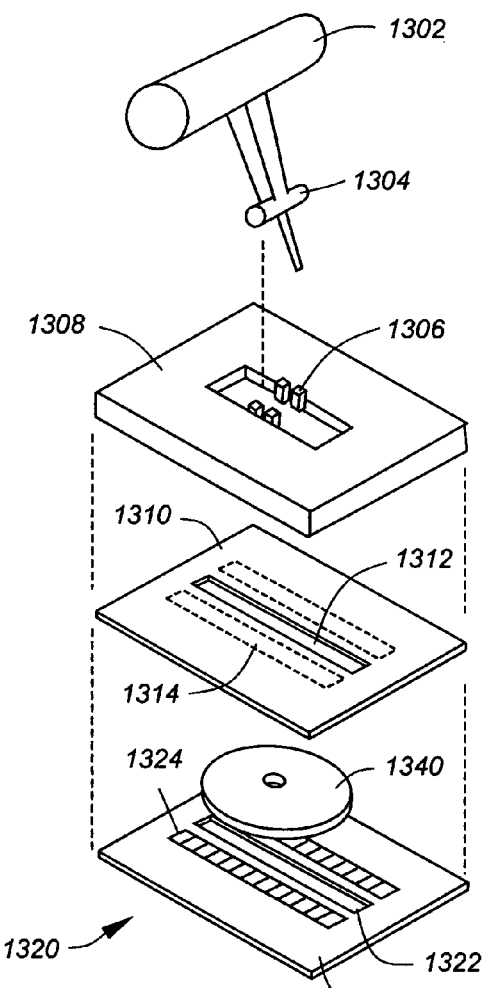
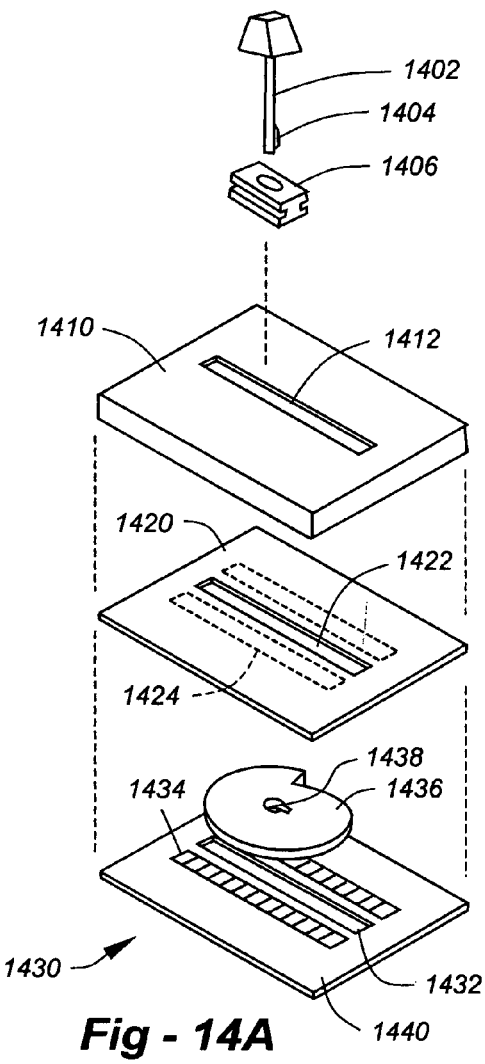
Fig - 13A
Fig - 14A
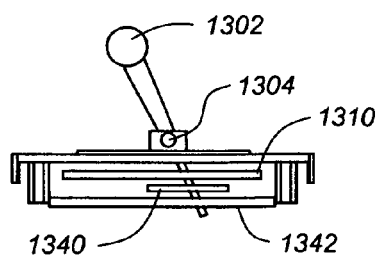
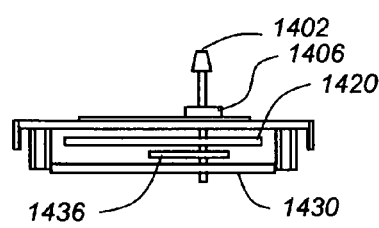
Fig - 13B
Fig - 14B

MOVING DIELECTRIC, CAPACITIVE POSITION SENSOR CONFIGURATIONS

REFERENCE TO RELATED APPLICATION

This application claims priority from U.S. provisional patent application Ser. No. 60/183,997, filed Feb. 22, 2000, the entire contents of which are incorporated herein by reference.

FIELD OF THE INVENTION

This invention relates generally to position sensors, including computer input devices such as joysticks and, in particular, to a capacitive position sensor which incorporates a moving dielectric.

BACKGROUND OF THE INVENTION

Joysticks for use as computer input devices have been available for over two decades. To facilitate operation in two directions, a popular electromechanical configuration employs orthogonal potentiometers physically coupled to a moveable element. As one example of many, U.S. Pat. No. 4,156,130 describes a joystick mechanism for transducing vector motion of an end of a joystick into its X and Y components. The apparatus includes X- and Y-potentiometers, each having a body and a shaft, a rod connecting the shaft of the X-potentiometer to the body of the Y-potentiometer so that the shafts of the X and Y-potentiometers lie at right angles to each other, and a joystick having one end attached to the shaft of the Y-potentiometer and which is oriented such that its effective axis lies at a right angle relative thereto.

One problem with potentiometer-based joysticks and other input devices is that the potentiometers are relatively expensive and include moving parts that may become dirty or worn, resulting in intermittent behavior. As such, alternative approaches have been tried using optical, Hall-effect, and capacitive transducers having fewer moving parts.

An early capacitive joystick is described in U.S. Pat. No. 4,305,007. According to this patent, four sensing electrodes of approximately equal capacitance are symmetrically arranged into pairs of opposing sensing electrodes within a common plane. Two pairs of resistors are electrically connected to receive discharge currents originating from each pair of opposing sensing electrodes, with each discharge current being a function of corresponding sensing electrode capacitance. A detector circuit electrically connected to both pairs of resistors for simultaneously detecting both continuous discharge currents from each pair of resistors, detecting differences therebetween, and generating two electrical outputs respectively.

U.S. Pat. No. 5,576,704 describes a capacitive joystick apparatus applicable to the control of work implements on machines which perform digging or loading functions such as excavators, backhoe loaders, and front shovels. The joystick includes a control shaft having an operator handle and a base. An actuating body is rigidly attached to the control shaft, and a cardan joint is provided to pivotally mount the control shaft to the base. A plurality of electrically non-contacting sensors sense the relative position of the shaft relative to the base. The sensors include a pair of spaced apart electrodes establishing an electrostatic capacity with each other, and a dielectric body being disposed between the electrode pair. Accordingly, as the control shaft pivots, the actuating body engages the dielectric body which moves the dielectric body relative to the electrode pair thereby modifying the capacitance of the sensor.

In U.S. Pat. No. 5,421,694, a non-contacting joystick includes a control shaft universally movable about a Z-axis. A spherical conducting body is attached to an end of the control shaft. A plurality of conducting plates are disposed circumjacent to the spherical body. A charging power supply supplies electrical energy of a first polarity to the spherical body and electrical energy of a second polarity to the plurality of conducting plates. Each conducting plate forms a variable capacitor with the spherical body. The capacitance value of each variable capacitor is a function of the displacement of the spherical body relative to the Z-axis. A circuit produces a plurality of position signals, each position signal being responsive to a capacitance value of a respective variable capacitor. The position signals indicate the relative position of the spherical body.

The computer pointing device described in U.S. Pat. No. 5,949,354 uses capacitors installed in various directions to generate pointing signals. The pointing device comprises a circuit board, a cap, and a detecting unit. The circuit board comprises a center point, a first conducting plate installed in a first direction and a second conducting plate installed in a second direction. The cap is movably installed above the center point of the circuit board. The bottom side of the cap has a top conducting plate which forms first and second capacitors with the first and second conducting plates separately. The detecting unit is electrically connected to the top, first and second conducting plates to detect the capacitance of the first and second capacitors and generate corresponding pointing signals to reflect the position of the cap in the first and second directions.

In U.S. Pat. No. 5,911,627, a joystick having an electromagnetic element is coupled to a movable stick, with at least a pair of orthogonal coils on an underlying substrate. The movement of the stick is detected by the amount of overlap of the electromagnetic element and the coils in each direction. The quality factor of the coil changes as more or less of the coil is overlapped, which can be measured by an electric circuit to determine the direction of movement and the amount of movement of the joystick. The coils could be made from traces on a printed circuit board (PCB), provided the use of a high enough (greater than 1 MHz) driving frequency, eliminating the need for a large, expensive wound coil.

In U.S. Pat. No. 5,786,997, a capacitively coupled, six axis joystick employs a sensor electrode having a perpendicular pair of slots and a fixed electrode assembly having capacitor electrodes formed on three mutually orthogonal surfaces of planar circuit boards that are complementarily nested within the slots of the sensor electrode. When nested together, the capacitor electrodes are separated from faces of the sensor electrode by spacings that depend on the rotational and translational movements of the sensor electrode relative to the electrode assembly. A signal generator and address decoder sequentially apply an alternating signal to the capacitor electrodes. The alternating signal is coupled to the closest associated faces of the sensor electrode to a degree dependent on the rotation- and translation-induced spacings. A controller detects and processes each coupled signal voltage to determine a degree of deflection of the sensor electrode in the X-, Y-, Z-, roll-, pitch-, and yaw-axis directions.

In existing capacitive joysticks, one electrode of a capacitive transducer is moved relative to a fixed electrode. Although the result is a simple physical arrangement, movement and/or pivoting of the capacitor electrode itself presents certain disadvantages, including wide fluctuations in the signal to be sensed, and variation between units, resulting in operational instability and the need for calibration. In certain unrelated types of devices, including control switches and shaft encoders, an element is rotated or translated relative to one or more fixed capacitor plates, resulting in accurate, reproducible operation.

A capacitance sensing system for sensing the rotary position of a rotating shaft, particularly one having limited rotary motion is described in U.S. Pat. No. 4,864,295. The system uses at least four capacitances comprising fixed capacitance plate members, one of which is preferably made of four arcuate segments enclosing the shaft and the other of which is a ring member enclosing the shaft and displaced therefrom along the shaft. A dielectric member is attached to the shaft between the fixed plate members. The capacitance value of the four capacitances change as the shaft rotates in such a manner that the capacitance changes produce an output voltage which represents the rotary position of the shaft, which output voltage is insensitive to radial motions of the shaft.

U.S. Pat. No. 5,537,109 resides in a variable capacitance, high-precision, stable transducer for detecting the position of a moving member. The device includes a first stationary conducting surface connected to a source, a second surface with at least two conducting, sensing regions, and a third movable conductive surface located between the first surface and the second surface and connected to the moving member. The third surface is adapted to modulate charge transferred from the source surface before reaching the sensing regions. The difference of signals detected at the individual sensing regions is utilized to determine the position of the moving member and the sum of the signals is utilized to achieve appropriate correction in a feedback loop connected to the source.

U.S. Pat. No. 5,598,153 teaches a measuring device for the measurement of a rotor angle including a capacitive angular displacement transducer generating an output that varies with an angular displacement of a shaft. A first stator has a plurality of transmitting electrodes to generate electric fields within the transducer due to excitation signals applied to the plurality of transmitting electrodes which are electrically conducting circle sectors of equal area which are electrically isolated from each other and which completely cover a rotational angle of $2\pi$ on the first stator. A second stator is parallel and coaxial to the first stator, and includes a conductive ring electrode receiving excitation from the first stator and producing an electric output signal. A rotor, located coaxially and parallel to the first stator and the second stator, has at least one rotor blade in the form of circle sectors, the central angle of each rotor blade being equal to at least the sum of the central angles of two sectors of the first stator. A signal processing unit determines the rotor angle in accordance with angle dependent transfer functions.

SUMMARY OF THE INVENTION

In broad and general terms, this invention resides in a capacitive sensor configuration which is capable of determining position and/or velocity for rotary or linear translation using a movable dielectric coupled to an elongate member. In contrast to existing devices which use potentiometers, optical couplers or electrical contacts to detect events or positions of devices, the use of a moving dielectric provides a low-cost, low-power, easy to manufacture and maintain input/output device applicable to the computer industry and other fields of endeavor.

In a preferred embodiment, the movable dielectric is supported between a plurality of stationary signal-transmitting plates and at least one stationary signal-detecting plates. By measuring the charge on the detecting plate, the capacitances of the assembly at a given point in time can be determined, and this measurement is used to solve for position of the dielectric element and elongate member. The calculations associated with the measurements are preferably carried out using a conventional microprocessor, the capabilities of which may be dedicated or shared to perform other functions associated with a piece of host equipment.

In the broadest application, the apparatus can be used to measure the position or velocity of a variety of devices, including computer peripherals such as mice, keyboards, joysticks, and other input control panels and linear position measurement apparatus. In the case of a joystick, a portion of the elongate member extends from a housing for user engagement. Z-axis control is also disclosed. In the case of a mouse, a pair of orthogonally oriented elongate members are physically coupled to a rotating ball. Each member connects to its own dielectric disposed between signal-transmitting and detecting plates.

The major benefits of the invention include:

1. Ease of designing special and unique geometries. The transmitter and detector patterns can easily be generated on any circuit board. The dielectric interrupter can be various materials, but in general can be molded out of common plastics.

2. Extremely fine resolution can be achieved if proper detection electronics and board layout are used. However, if less resolution is acceptable, cost effective common components can be used.

3. The method uses several times less power than conventional optic pair detectors making it an appropriate technology for laptops and cordless devices.

BRIEF DESCRIPTION OF DRAWINGS

FIG. 1A is an oblique drawing which illustrates the applicability of the invention to a joystick;

FIG. 1B is a side-view drawing of the joystick of FIG. 1A;

FIG. 10A is a perspective drawing which illustrates use of the invention with respect to a rotary knob embodiment of the invention;

FIG. 10B is a side-view drawing of the rotary knob device;

FIG. 13A is a perspective drawing which illustrates use of the invention with respect to a T-bar type game controller embodiment;

FIG. 13B is a side-view drawing of the T-bar type game controller;

FIG. 14A is a perspective drawing which illustrates a slider with a twist-axis control according to the invention; and FIG. 14B is a side-view drawing of the embodiment of FIG. 14B.

DETAILED DESCRIPTION OF THE INVENTION

Figure 2:
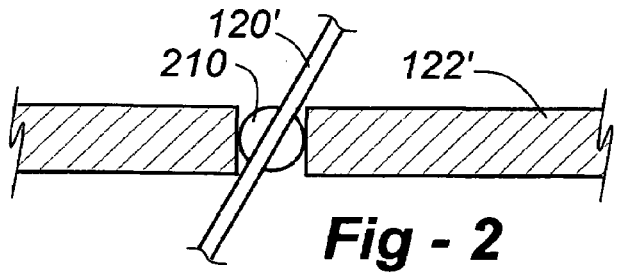
FIG. 2 is a side-view drawing which shows a preferred method of coupling a joystick lever to a moving dielectric disk.

The capabilities of the invention will be illustrated with respect to the joystick depicted in FIGS. 1A and 1B, with the understanding that the technology is applicable to various other device types. The joystick of FIG. 1 is preferably constructed with an upper plate and a lower plate mounted in a housing such as a plastic case 110. The plates are preferably formed using metallization patterns on printed-circuit boards (PCBs). A lower PCB 104 incorporates transmitting metallization 111 on its upper surface. The transmitting metallization 112 is preferably separated into a plurality of sections 112 as needed for accuracy and/or speed in detecting of the position of the joystick lever 120. An upper PCB 106 preferably features a continuous or unbroken metalization pattern 114 on its lower surface. Alternatively, the upper plate 106 may be segmented, with the metalization of the lower PCB 104 being undivided.

When the upper and lower circuit boards 104, 106 are mounted in the case 110, the metallization patterns 112 and 114 are parallel and opposed to each other, forming at least one capacitor. Since the charge collected on the detecting plate is relatively small, additional shielding metallizations may be added as desired to keep stray noise from the active plates which might otherwise corrupt the measurement. Each metallization pattern surrounds a corresponding central hole through which the lower end of the lever 120 of the joystick passes.

Proximate to the lower end of the joystick lever 120 a dielectric disc 130 is supported. The dielectric need not be rigid, and its distance from the plates need not be tightly controlled. If non-conducting, the dielectric may be relatively flimsy and may even be allowed to touch the metallization patterns. However, if the moving element is composed of metal, the distance to the plates would be more important, and the metal should not be allowed to touch the metallization patterns.

As the joystick lever is moved, the dielectric disc 130 is also moved, overlapping different portions of the metallization patterns. By measuring the charge on the detecting plate, the capacitance, and therefore the position of the lever, may be determined. If the dielectric disc has appreciable thickness, the hole through which the lever passes must be larger than the lever arm to facilitate pivoting. To eliminate play when the lever is centered, a spherical element 210 is preferably disposed on the lever 120' having a diameter corresponding to the hole in the dielectric 130', as shown in FIG. 2. Even though the sphere is at different heights for different angles of the lever, if the disk is thick enough the sphere will move relative to the hole but not move out.

Figure 3:
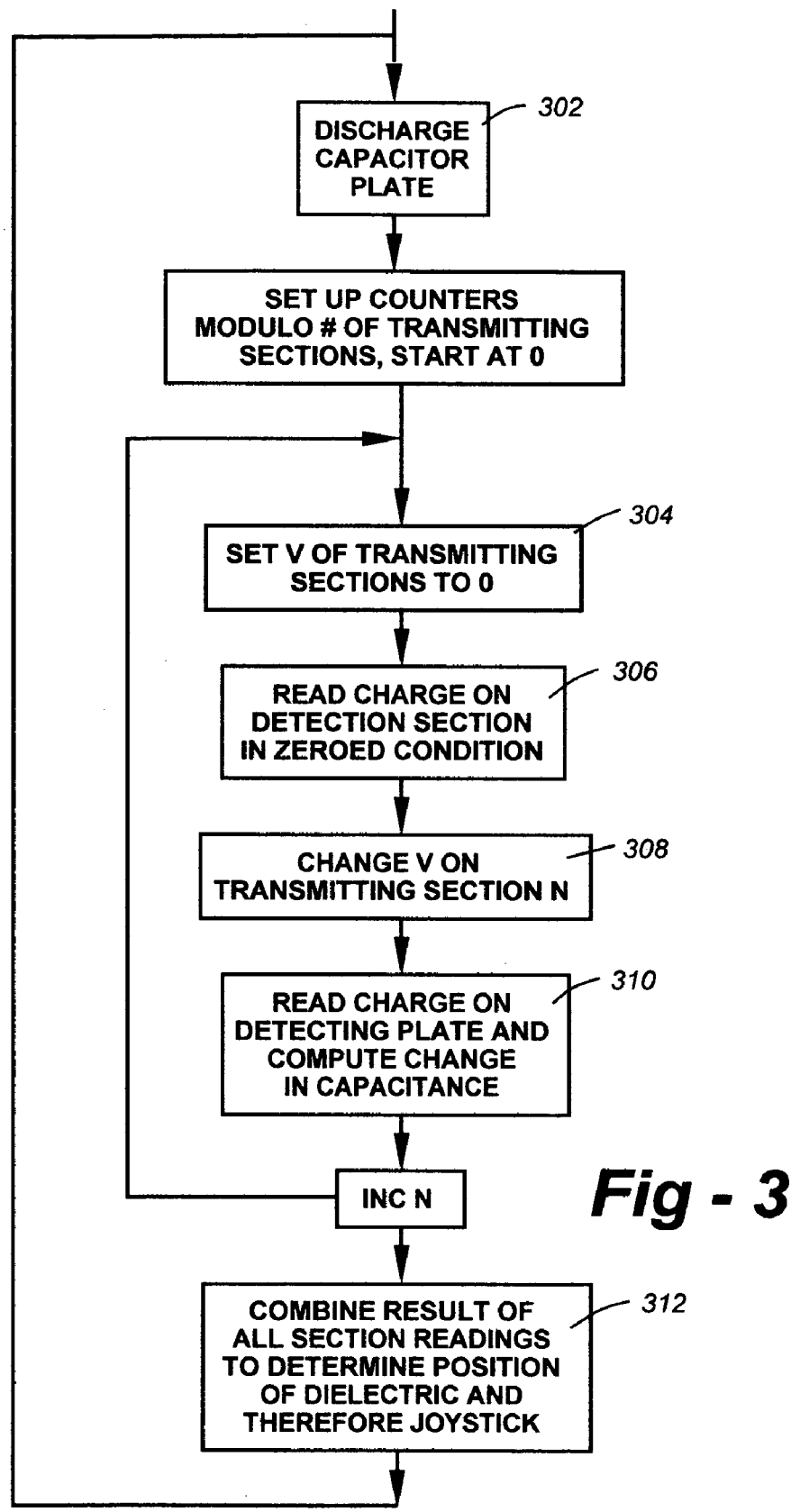
FIG. 3 is a flow chart which illustrates a measurement function according to the invention.

To reduce the cost of supporting electronics, the measurements of the disk relative to the transmitting and detection plates are preferably conducted serially, as shown in the flow chart of FIG. 3. The system is set up to repetitively cycle among the separate transmitting sections of the capacitor. At step 302 the detector plate is discharged, and at step 304, the voltages on all the transmitting sections are set to zero. At block 306, the charge on the detecting plate is measured in this discharged state. The voltage on the nth section of the transmitting plate is changed to a known value at block 308. The charge on the detecting plate is again measured at 310, and the capacitance of the nth section is determined from the difference in charge between the two above measurements. After cycling through all the sections, the position of the dielectric disc can be determined from the measured capacitances at step 312, and the position can be communicated to the computer system, game, or other piece of external equipment. The entire process is repeated so that the next position can be determined and reported.

In some cases, it may be advantageous to not measure sections individually, but rather, to charge one or more transmitting sections while discharging others. This measures the change in capacitance more directly.

It is usually less expensive to have n transmitters and 1 detector, but for speed or other reasons, it may be advantageous to reverse roles.

Figure 4:
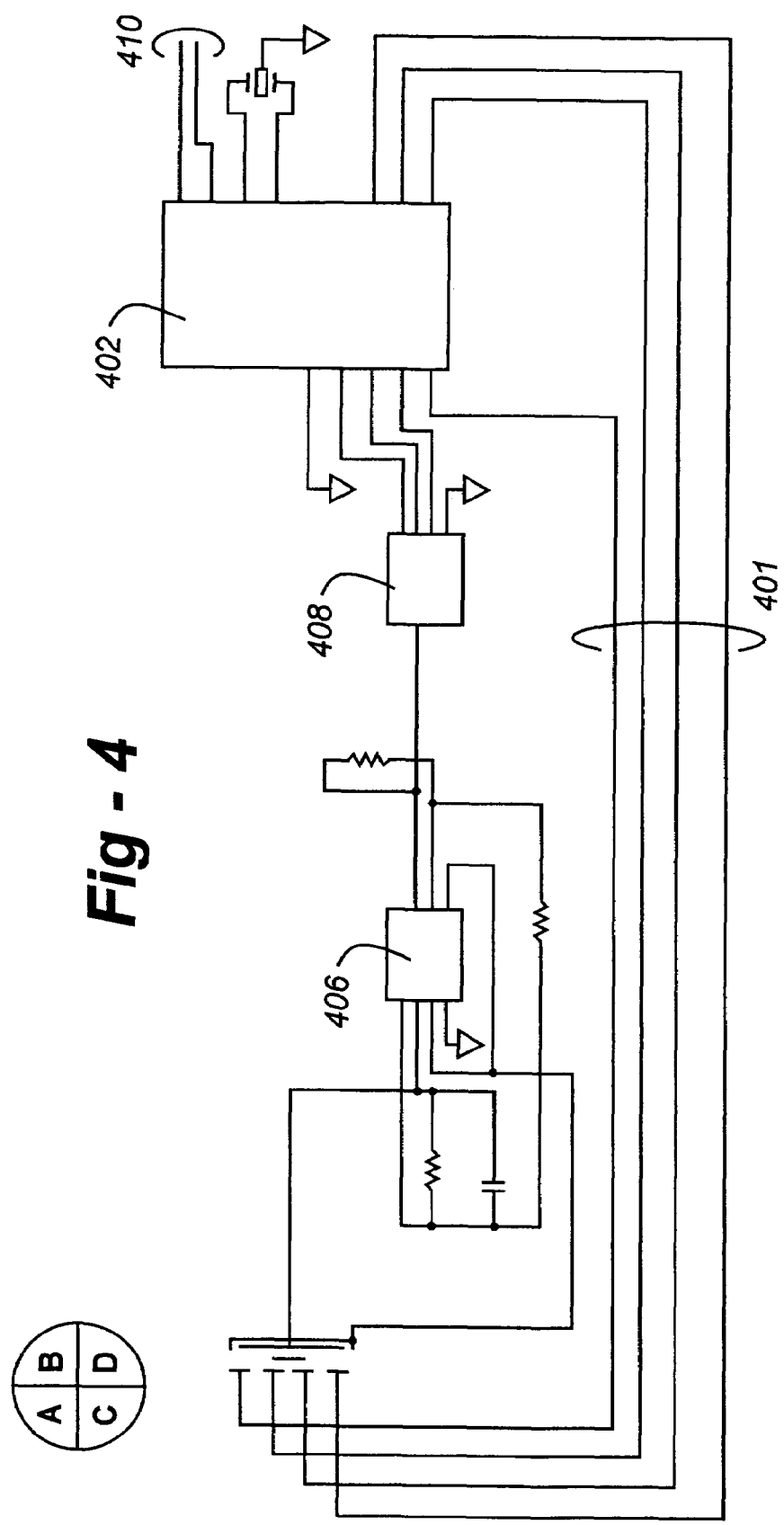
FIG. 4 is a block diagram showing important electrical components.

The block diagram of FIG. 4 illustrates important circuitry used to measure the charge and control the system. The detecting plate is kept in a partially discharged state by a high-valued resistor (i.e., a 20 MΩ) or by other means. In operation, buss outputs 401 from the microprocessor 302 are used to charge the transmitting plates A, B, C and D. The input from the detecting plate is fed into an op-amp 406 to boost the signal to a known range so that an A/D converter 408 can be used to feed a value into the microprocessor 402. After processing, the microprocessor outputs values to the system through port 410. The precision of the moving dielectric capacitive sensor may be improved with the use of high precision analog-to-digital converters if needed or the sensor can be implemented using cost efficient components and retain a good resolution.

Figure 5:
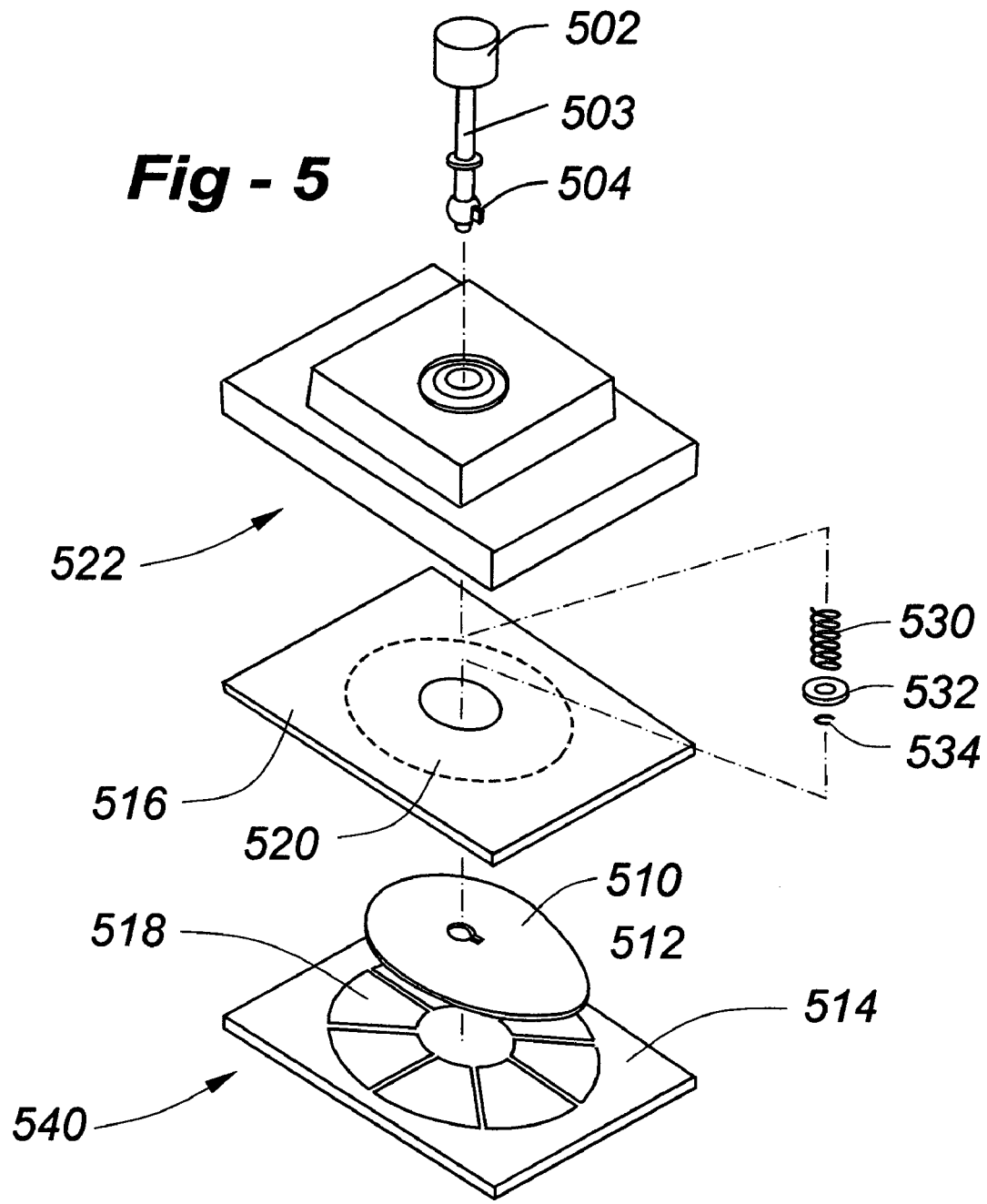
FIG. 5 is a drawing which illustrates the applicability of the invention to a joystick including a z-axis control capability.

FIG. 5 is a drawing which illustrates the applicability of the invention to a joystick including a z-axis control capability. The non-directional lever has been replaced with a rotational control, preferably including a knob 502 and a shaft pin 504 coupled to an asymmetric disk 510. The disk 510 includes a keyed hole 512 in registration with the shaft pin 504; otherwise, the transmitting and detector plates 514, 516, including respective metallization patterns 518, 520, are similar if not identical to the plates in the non-Z-axis version described above. The use is again preferably housed in a plastic base 522, through which a joystick type lever 503 protrudes. A spring 530, spring seat 532 and retaining clip 534 are preferably used to keep the lever 503 with knob attached thereto biased upwardly for fine control. Related electronics 540 (not shown) are again preferably located on the lower PCB 514.

To measure the x displacement, y displacement and angular position of a non-axially symmetric disk 510, the expression becomes $$r(\theta) = r_0 + a_2 \cos(2\theta) + a_3 \cos(3\theta).$$

When displaced from the center and rotated, the formula for the perimeter of the dielectric is approximately $$\rho(\theta) = r_0 + x \cos(\theta) + y \sin(\theta) + a_2 \cos(2(\theta+\phi)) + a_3 \cos(3(\theta+\phi))$$

Using complex notation, we may write $$\rho(\theta) = r_0 + b_1 e^{i\theta} + b_{-1} e^{-i\theta} + b_2 e^{2i\theta} + b_{-2} e^{-2i\theta} + b_3 e^{3i\theta} + b_{-3} e^{-3i\theta}$$

where $$2b_1 = x+iy;\ 2b_2 = a_2 e^{2i\phi};\ \text{and}\ 2b_3 = a_3 e^{3i\phi}$$

$b_{-n} = b_n^*$, so that $\rho(\theta)$ is real.

The area under the m-th section of a set of N pie-shaped electrodes is $$W_m^N = \int_{2\pi m/N - \pi/N}^{2\pi m/N + \pi/N} \rho^2(\theta) d\theta/2$$

The capacitances of each electrode to the Rx electrode are related to this area by $$C_m^N = C_0 W_m^N + C_1 - C_2$$

Where $C_1$ is the capacitance the sensor would experience were there no dielectric present, $C_2$ is the capacitance the center hole would have if it existed, and $C_0$ is the extra capacitance per unit area due to the presence of the dielectric.

In linear theory $$W_m^N \approx \pi r_0^2 + \int_{2\pi m/N - \pi/N}^{2\pi m/N + \pi/N} [\rho(\theta) - r_0] d\theta$$

In the following description, the angle is determined independently of an overall additive or multiplicative constant in the capacitances. The displacements x,y are determined except for a multiplicative factor which can be easily determined in construction. The additive terms cancel in the final result, which depends only on the difference in capacitance. Thus, we may consider the weights W to be equivalent to the capacitances $C_m^N$ for the purposes herein.

For the dielectric above, we have $$C_m^N = \int_{2\pi m/N - \pi/N}^{2\pi m/N + \pi/N} \left( \sum_{n=-3}^{n=3} b_n e^{in\theta} \right) d\theta = \sum_{n=-3}^{3} b_n e^{i\frac{2\pi nm}{N}} \left( \frac{2\sin\left(\frac{\pi}{N}n\right)}{n} \right)$$

For the case N=8, this reduces to $$C_m^8 = \left( \sum_{n=-3}^{n=3} b_n e^{in m\pi/4} \right) \left( \frac{2\sin\left(\frac{\pi}{8}n\right)}{n} \right)$$

We may invert this series to determine the coefficients bk in terms of the W's, and we find $$x = k_1 \sum_{n=0}^{7} \cos\left(\frac{\pi}{4}n\right) C_n^8 \quad \cos(2\phi) = k_2 \sum_{n=0}^{7} \cos\left(\frac{\pi}{2}n\right) C_n^8$$

$$y = k_1 \sum_{n=0}^{7} \sin\left(\frac{\pi}{4}n\right) C_n^8 \quad \sin(2\phi) = k_2 \sum_{n=0}^{7} \sin\left(\frac{\pi}{2}n\right) C_n^8$$

$$\cos(3\phi) = k_3 \sum_{n=0}^{7} \cos\left(\frac{3\pi}{4}n\right) C_n^8$$

$$\sin(3\phi) = k_3 \sum_{n=0}^{7} \sin\left(\frac{3\pi}{4}n\right) C_n^8$$

It is straightforward to give expressions for $k_1$, $k_2$, and $k_3$, but $k_1$ does not need to be determined, because the scale may be derived experimentally in the development of the software. In addition, $k_2$, and $k_3$ cancel in determining $\phi$, and therefore likewise need not be determined.

$x_1$ and $y_1$ are simply the x,y displacements scaled by factor $k_1$, while $$(2\phi)_{mod\ 2\pi} = \text{angle}(x_2, y_2)$$

$$(3\phi)_{mod\ 2\pi} = \text{angle}(x_3, y_3)$$

Figure 6:
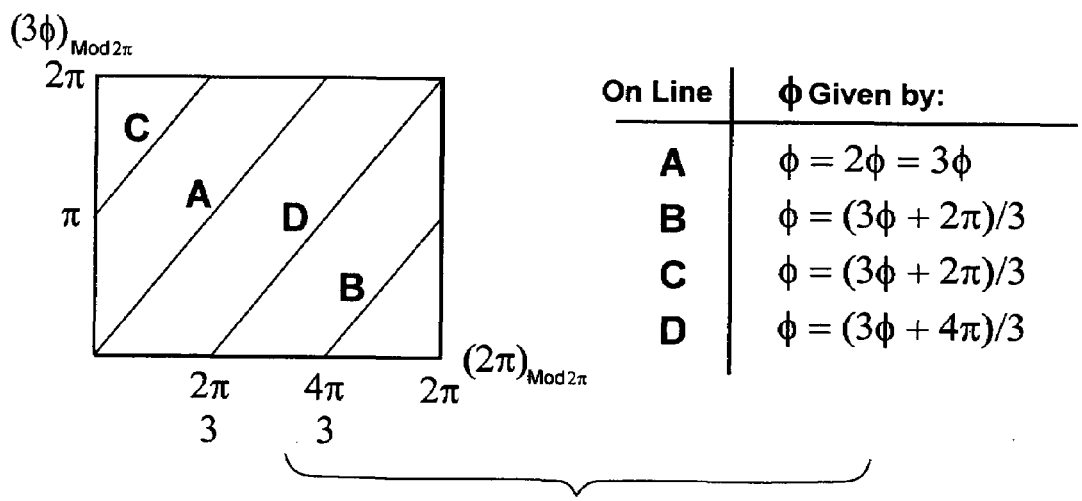
FIG. 6 is a plot used to determine the angle $\phi$ in a joystick including a z-axis control capability according tot he invention.

We can determine $\phi$ itself by considering the plot of FIG. 6. Note that if $\phi$ need not be known except over $\pi$ (i.e., if the second solution differing by 180 degrees is not a problem), then the dielectric's shape can have $a_3 = 0$, so that it becomes symmetric, and the number of plates can be reduced, and the considerations of FIG. 6 are unnecessary).

Figure 7:
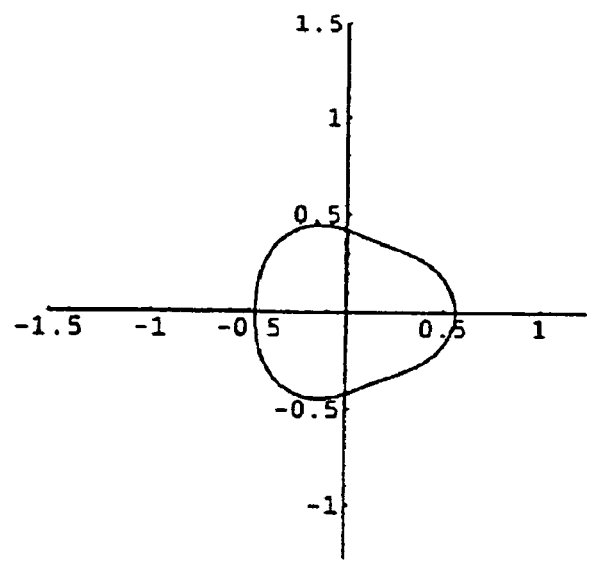
FIG. 7 presents an example of the curve $r_0 + a_2 \cos(2\theta) + a_3 \cos(3\theta)$ in a joystick including a z-axis control capability according tot he invention.

FIG. 7 presents an example of the curve $r_0 + a_2 \cos(2\theta) + a_3 \cos(3\theta)$, where $r_0 = 0.47$, $a_2 = 0.047$, and $a_3 = 0.047$.

Figure 8:
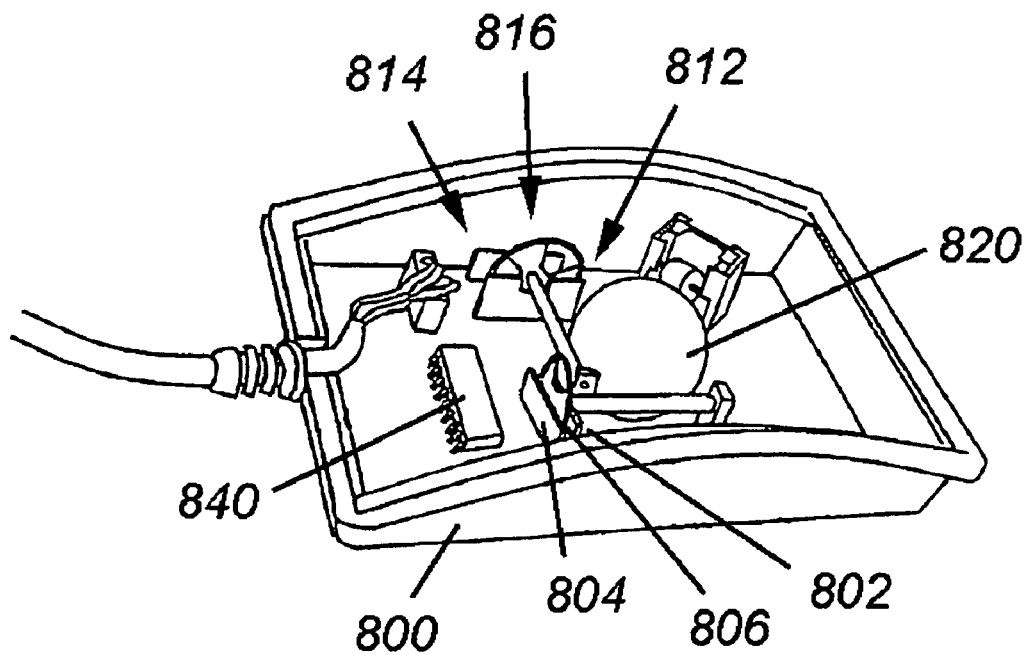
FIG. 8 illustrates an alternative use of the invention in a mouse configuration.

FIG. 8 illustrates an alternative use of the invention in a mouse configuration, wherein a pair of moving dielectric capacitive sensors replace two potentiometer or optic emitter/detector pairs. The X transmitter PCB with metallization is shown at 802, whereas the X detector PCB with metalization is shown at 804. A first dielectric interrupter wheel is shown at 806. An identical assembly is provided for the Y dimension, including transmitter PCB with metallization 812, detector PCB with metallization 814, and dielectric interrupter wheel 816. Each interrupter wheel is coupled to an elongated element disposed orthogonally with respect to one another, enabling ball 820 to move either or both as the housing 800 is moved on an appropriate surface. Related electronics are shown at 840 on a separate printed circuit board.

The dielectric used resembles three petals turning between the two circuit boards. The current common method for detecting mouse movement is to use two optic emitter/detector pairs. These optic devices require a significant amount of power, about 90 percent of the total power that the mouse uses. The optical components also suffer from manufacturing defects, and are relatively costly, the third highest cost of the entire device. Using this detection method these parts are eliminated while there is an increase in the sensitivity of the mouse. The moving dielectric replaces the current optical interrupter wheel and simple circuit boards replace the emitter/detector pairs. In addition, the method requires very little power, an advantage for a battery-powered mouse.

As discussed above, the invention is applicable to a wide variety of other types of position sensors and other input and non-input configurations, including rotary knobs and translational sliders, keyboards, tachometers and other input and non-input configurations. In addition to joystick and mouse configurations, examples of use in the computer industry include the following:

Scroller Devices

Figure 9A:
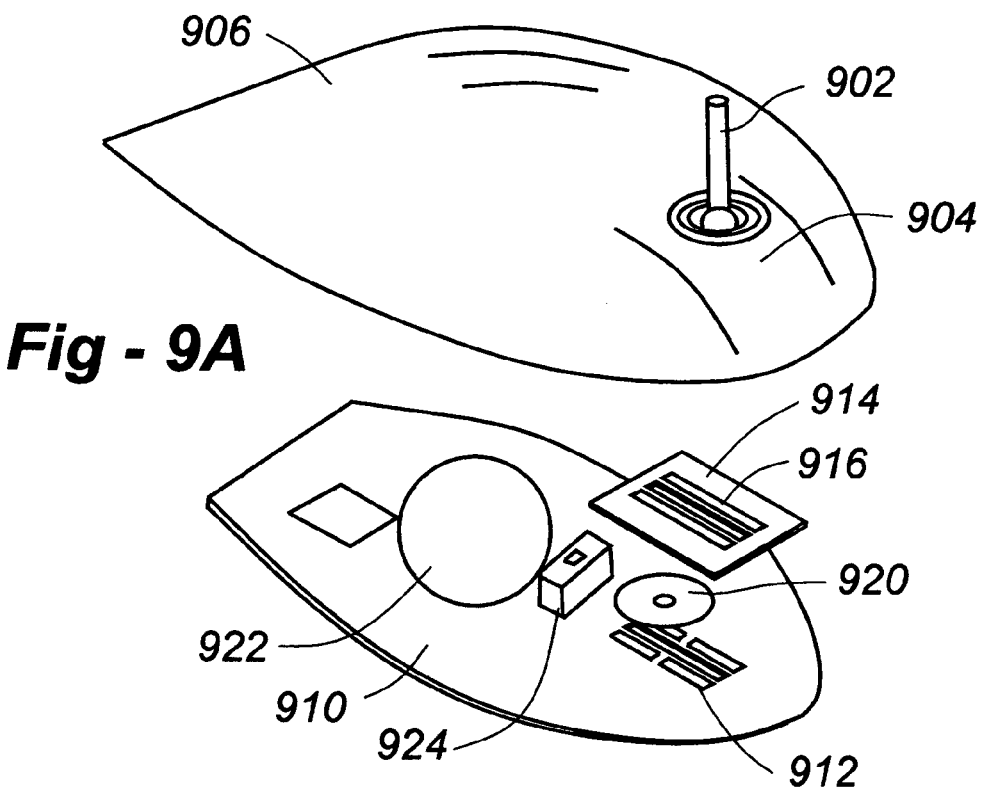
FIG. 9A is a perspective drawing which illustrates use of the invention with respect to a scroller device of the type found on newer mice, which include an extra wheel or rocker button that can be moved with a finger.
Figure 9B:
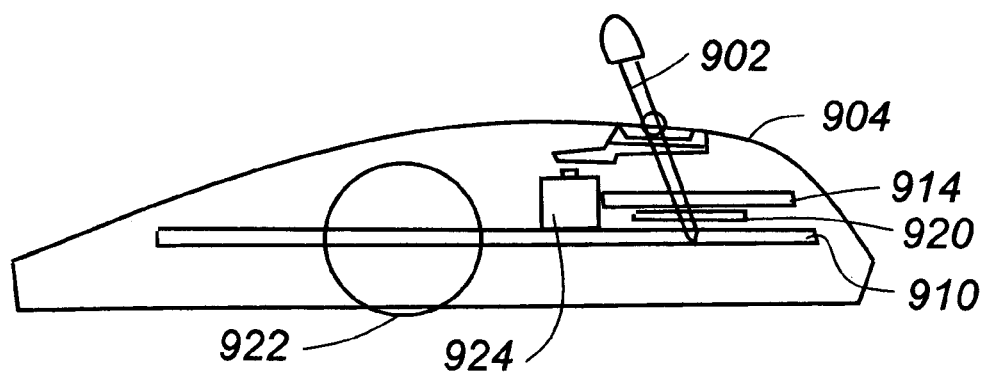
FIG. 9B is a side-view drawing of the scroller device.

These are found on newer mice, and include an extra wheel or rocker button, which can be moved with a finger. FIG. 9A illustrates one such configuration from an oblique perspective, whereas FIG. 9B shows the device from a side-view perspective.

In terms of hardware, a scroller lever 902, preferably protrudes through a flexible lever seat 904 in a case top 906. A lower PCB 910 includes transmitting metallization 912 on its upper surface, and an upper PCB 914 includes a detector metallization 916 on its lower surface. The dielectric disc is shown at 920, and the related electronics and mouse ball are depicted at 922. A lever switch is shown at 924. Movement of this device may be detected in accordance with the invention by passing the material attached to the scroller knob between two plates on parallel circuit boards.

Rotary Knobs

Any device that uses rotary knobs can use this technology to detect the movement and position of the knob. Examples include knobs for volume control, jog/shuttle knobs, or any other rotary control input. FIG. 10A a rotary knob embodiment from an oblique perspective, whereas FIG. 10B shows the device from a side-view perspective. A knob and shaft 1002 terminates in a key 1004, such that when protruding through a plastic base 1000, engages with a keyed hole 1006 in a shaped piece of dielectric material 1008. An upper PCB 1010, includes detector metallization 1012 on its lower surface, whereas a lower PCB 1020 includes transmitting metallization 1022 on its upper surface. Related electronics 1040 are preferably mounted to the lower PCB 1020.

Linear Slider Inputs

Figure 11:
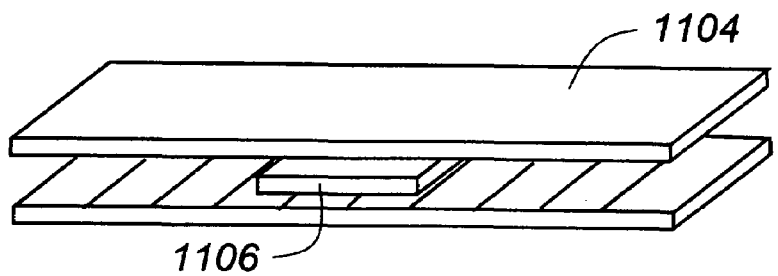
FIG. 11 is a schematic illustration of a linear slider according to the invention.

A linear detector of almost any length can be easily constructed according to the invention, since the determining factors are the circuit board pattern and the dielectric geometry. A schematic illustration of a slider control is shown in FIG. 11. The transmitting sections in this application are preferably implemented as fingers 1102, with the granularity of measurement determined by the number of fingers utilized. The upper, detector plate is depicted at 1104, and the movable slider at 1106.

A dielectric element of convenient shape is positioned between the two conducting surfaces, such that one, Rx, acts as a receiver, while the other is split into multiple transmitting (Tx) elements. The position of the dielectric is determined by measuring the capacitance between the Tx and Rx elements.

As an example of a slider embodiment, assume the dielectric is rectangular, with the longitudinal length being twice the length of any Tx segment. A rough position of the dielectric is readily determined by determining the largest capacitance, and the next-largest capacitance. For greater accuracy, however, the capacitances may be measured in pairs:

| | | |
|---|---|---|
| $C_{A1} = C_0 + C_1$ | and | $C_{B1} = C_1 + C_2$ |
| $C_{A2} = C_2 + C_3$ | | $C_{B2} = C_3 + C_4$ |
| ... | | ... |
| $C_{AN} = C ...$ | | $C_{BN} = C$ |

In accordance with the above, if not for end effects and manufacturing errors, the position of a dielectric rectangle may be determined by either of the following two formulae:

$$x = \left[\sum_{n=1}^{N} 2nl(C_{An} - C_A)\right] / \left[\sum_{n=1}^{N} (C_{An} - C_A)\right] \text{ or}$$

$$x = \left[\sum_{n=1}^{N} (2n+1)l(C_{Bn} - C_B)\right] / \left[\sum_{n=1}^{N} (C_{Bn} - C_B)\right]$$

where x is the center of the dielectric disk as measured from a line between $C_0$ and $C_1$, l is the length of a single Tx section, and $C_A$ (=$C_B$) is the capacitance of two Tx plates to the Rx plate when no dielectric interposes. The two formulae may be improved by eliminating all terms which should be zero if measurements were exact. For example, by keeping only the two terms with $C_{An}$ (or $C_{Bn}$) largest in both the numerator and denominator will eliminate inaccuracy due to measurements of "zero."

To smooth over edge effects, one can move smoothly from one formula to the other. A is valid when $x \in l(2m+1+/-3/4)$ m=0, 1 ...

and B is valid when $x \in l(2m+/-3/4)$ m=1, 2 ...

Figure 12:
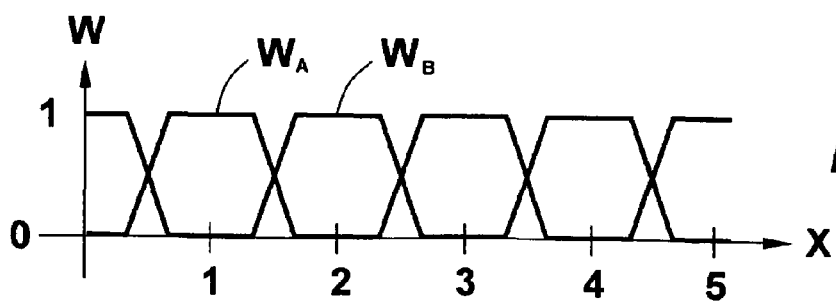
FIG. 12 is a diagram which shows how one can use weights which change smoothly from one to another to average the overlapping regions of a linear position control according to the invention.

In the overlapping regions, one can average using weights which change smoothly from one to another, as shown in FIG. 12. A circular dielectric has the advantage of no angular alignment being necessary. However, the above formulae for the position, though surprisingly good, are no longer accurate. By making the diameter of the disk larger than the width of the transmitting plate, linearity is improved, such that at about 1.5 times the width, the formulae presented herein become exact.

The slider-type arrangement may be used in a variety of control configurations. FIGS. 13A and B illustrate a T-bar type game controller embodiment. A T-shaped handle 1302 is coupled to a pivot 1304, which seats in a pivot catch 1306 formed in a base 1308. An upper PCB 1304 includes a slot 1312 and detector metallization 1314 on its lower surface. A lower PCB 1320 includes a corresponding slot 1322, along with sectioned transmitting metallization 1324. The dielectric disk is shown at 1340, with related electronics 1342 preferably being mounted on the bottom side of board 1320.

FIGS. 14A and B illustrate a slider including a twist-axis control. In this embodiment, a slider knob 1402 interfaces to a shaft key 1404 which, in turn, is coupled to a slide block 1406. Base 1410 includes a base slot 1412. An upper PCB 1420 includes a slot 1422 and detector metallization 1424 disposed on its lower side. A lower PCB 1430 includes a corresponding slot 1432, with inter-digitated transmitting metallization 1434 disposed on its upper side. A shaped dielectric disk 1436 includes a keyed hole 1438 which mates with and engages to the shaft key 1404 of slider knob 1402.

Using weight to move the dielectric in a joystick configuration may also be used in free floating "handlebar" type game controller. Damping may be provided through the application of a non-conductive "grease" between the dielectric disk and the sensor plates (such as silicone grease with rated viscosity). Weight may be provided above the disk to provide higher frequency of pendulum, making it easier to isolate the natural pendulum frequency from deliberate movement of the device. The spherical element shown in FIG. 2 may be added to any of these versions. The pivot can be any 2-D pivot, or can be a fixed attachment of a flexible string or wire. The stiffness of the wire will affect the quantitative result of the measurement, but this may can easily be taken into account by scaling the numerical values of the displacement from the center.

Further Alternative Embodiments

A keyboard switch can be replaced with this technology. The key simply moves between the detection plates when the key is pressed. A tachometer can be made to measure the speed of a motor or other rotating machinery using petals similar to the mouse position detection and measuring frequently to determine the angular velocity. Other non-input device applications are also possible. For example, on a printer the paper or door-open detectors may be implemented using this technology.

I claim:

1. A capacitive position sensor configured for interconnection to a utilization device, comprising:
   a stationary signal-detecting capacitor plate;
   a stationary signal-transmitting capacitor plate supported parallel to, and spaced apart from, the signal-detecting capacitor plate, the transmitting capacitor plate being divided into a plurality of electrically separated segments;

a non-circular, movable dielectric element disposed between the signal detecting and signal-transmitting capacitor plates;

an elongate member having a user-manipulable proximal end and a distal end coupled to the dielectric element, the member being operative to rotate and laterally shift the element in the x or y directions in a plane substantially parallel to the stationary plates as a function of user position;

circuitry in electrical communication with the stationary plates, the circuitry being operative to (a) measure the capacitance between each segment of the signal-transmitting plate and the signal-detecting plate, (b) determine the position of the elongate member in the x and y directions as a function of the measured capacitance, and (c) determine rotation of the elongate member as a function of the measured capacitance, with or without lateral shifting of the dielectric element; and an output for communicating the x-y position and rotation to the utilization device.

2. The position sensor according to claim 1, wherein the utilization device is a computer.

3. The position sensor according to claim 1, wherein the elongate member is a user-graspable joystick.

4. The position sensor according to claim 1, wherein the segments of the signal-transmitting plate are arcuate.

5. The position sensor according to claim 1, wherein the dielectric element is oval or egg-shaped.

6. The position sensor according to claim 1, wherein the plurality of electrically separated segment includes 3 or 4 arcuate segments.

7. The position sensor according to claim 1, wherein:

the elongate member includes a pivoting coupling between the first and second ends of the elongate member; and the distal end of the elongate member is loosely coupled to the dielectric element so that the dielectric element remains in a plane substantially parallel to the stationary plates as the dielectric element is rotated or laterally shifted.

8. The position sensor according to claim 1, wherein:

the movement of dielectric element is constrained by the spacing of stationary plates so that the dielectric element remains in a plane substantially parallel to the stationary plates as the dielectric element is rotated or laterally shifted.

9. The capacitive position sensor according to claim 1, wherein the dielectric element has a periphery described by:

$$r(\theta)=r_0+a_0\cos(2\theta)+a_3\cos(3\theta).$$

10. A capacitive-based joystick configured for interconnection to a utilization device, comprising:

a housing having a top surface;

a stationary signal-detecting capacitor plate disposed within the housing;

a stationary signal-transmitting capacitor plate disposed within the housing parallel to, and spaced apart from, the signal-detecting capacitor plate, the transmitting capacitor plate being divided into a plurality of electrically separated segments;

a non-circular, movable dielectric element disposed within the housing between the signal-detecting and signal-transmitting capacitor plates;

a joystick lever supported for pivotal movement having a proximal end for user engagement and a distal end loosely coupled to the dielectric element, enabling the lever to rotate and laterally shift the dielectric element in x and y directions in a plane substantially parallel to the stationary plates as a function of user position;

circuitry in electrical communication with the stationary plates, the circuitry being operative to (a) measure the capacitance between each segment of the signal-transmitting plate and the signal-detecting plate, (b) determine the position of the joystick lever in the x and y directions as a function of the measured capacitance, and (c) determine rotation of the joystick lever as a function of the measured capacitance, with or without lateral shifting of the dielectric element; and an output for communicating the user position to the utilization device.

11. The joystick according to claim 10, wherein the utilization device is a computer.

12. The joystick according to claim 10, wherein the segments of the signal-transmitting plate are arcuate.

13. The joystick according to claim 10, wherein the plurality of electrically separated segment includes 3 or 4 arcuate segments.

14. The joystick according to claim 11, wherein the dielectric element has a periphery described by:

$$r(\theta)=r_0+a_2\cos(2\theta)+a_3\cos(3\theta).$$

* * * * *

UNITED STATES PATENT AND TRADEMARK OFFICE
CERTIFICATE OF CORRECTION

PATENT NO. : 7,602,376 B1  Page 1 of 1
APPLICATION NO. : 09/684205
DATED : October 13, 2009
INVENTOR(S) : Jack Hetherington It is certified that error appears in the above-identified patent and that said Letters Patent is hereby corrected as shown below:

Column 7, line 7: Replace "$W_m^N = \int_{2\pi m/N - \pi/N}^{2\pi m/N + \pi/N} \rho^2(\theta) d\theta / 2$"

with -- $W_m^N = \int_{2\pi m/N - \pi/N}^{2\pi m/N + \pi/N} \rho^2(\theta) d\theta / 2$ --.

Column 7, line 18: Replace "$W_m^N \approx \pi r_0^2 + \int_{2\pi m/N - \pi/N}^{2\pi m/N + \pi/N} [\rho(\theta) - r_0] d\theta$"

with -- $W_m^N \approx \pi r_0^2 + \int_{2\pi m/N - \pi/N}^{2\pi m/N + \pi/N} [\rho(\theta) - r_0] d\theta$ --.

Column 9, line 65: Replace "Bis" with --B is--.

Column 12, line 3: Replace "$r(\theta) = r_0 + a_0 \cos(2\theta) + a_3 \cos(3\theta)$" with -- $r(\theta) = r_0 + a_2 \cos(2\theta) + a_3 \cos(3\theta)$ --.

Signed and Sealed this

Ninth Day of March, 2010

David J. Kappos
*Director of the United States Patent and Trademark Office*

UNITED STATES PATENT AND TRADEMARK OFFICE
CERTIFICATE OF CORRECTION

PATENT NO.        : 7,602,376 B1                                    Page 1 of 1
APPLICATION NO.   : 09/684205
DATED             : October 13, 2009
INVENTOR(S)       : Jack H. Hetherington It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2242 days.

Signed and Sealed this

Fifth Day of October, 2010

David J. Kappos
*Director of the United States Patent and Trademark Office*